United States Patent
Sung et al.

(10) Patent No.: US 8,359,383 B2
(45) Date of Patent: Jan. 22, 2013

(54) UBIQUITOUS SERVICE FRAMEWORK SYSTEM FOR SUPPORTING SERVICE IN MULTIPLE DOMAIN AND METHOD THEREOF

(75) Inventors: Jung-Sik Sung, Daejeon (KR);
Young-Sik Chung, Daejeon (KR);
Eui-Hyun Paik, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 218 days.

(21) Appl. No.: 12/869,918

(22) Filed: Aug. 27, 2010

(65) Prior Publication Data

US 2011/0055324 A1 Mar. 3, 2011

(30) Foreign Application Priority Data

Sep. 1, 2009 (KR) .......................... 10-2009-0082163
Mar. 30, 2010 (KR) .......................... 10-2010-0028469

(51) Int. Cl.
*G06F 15/173* (2006.01)

(52) U.S. Cl. ........................................ 709/223; 203/224

(58) Field of Classification Search .................. 709/203, 709/223, 224
See application file for complete search history.

(56) References Cited

U.S. PATENT DOCUMENTS 7,519,915 B2    4/2009    Shalabi et al. ................ 715/762
7,827,267 B2    11/2010   Chun ............................ 709/223

FOREIGN PATENT DOCUMENTS

KR    10-2006-0094202        8/2006

*Primary Examiner* — Adnan Mirza
(74) *Attorney, Agent, or Firm* — Staas & Halsey LLP (57) ABSTRACT

The present invention relates to a server for supporting one service in multiple domains, including: a service management unit that receives service and service execution engine from a service providing server and registers them in a service DB; a profiling server unit that requests device profile to user terminals according to a request from the service management unit and parses device profile received from the user terminals and stores it in a device DB; a service ensembler that generates a list of services usable in the user terminal based on the device profile stored in the device DB and provides the list of services to the user terminals and extracts a service execution engines suitable for the user terminals from the service DB according to user selection and transmits them to the user terminals.

14 Claims, 7 Drawing Sheets

UBIQUITOUS SERVICE FRAMEWORK SYSTEM FOR SUPPORTING SERVICE IN MULTIPLE DOMAIN AND METHOD THEREOF

CROSS REFERENCE TO RELATED APPLICATIONS

This application claims priority to Korean Patent Application No. 10-2009-0082163 filed on Sep. 1, 2009, and Korean Patent Application No. 10-2010-0028469 filed on Mar. 30, 2010, the entire contents of which are herein incorporated by reference.

BACKGROUND OF THE INVENTION

1. Field of the Invention

The present invention relates to a ubiquitous service framework system for supporting service in multiple domains and a method thereof. More particularly, the present invention relates to a framework system capable of receiving services in other domains in a ubiquitous computing environment where independent service domains are connected to each other and a method thereof.

2. Description of the Related Art

A ubiquitous computing environment where users receiving services can provide the most suitable information or services to other users by using optimized apparatuses around users anytime and anywhere has been created. A need exists for a method for continuously providing services while supporting mobility of users without inconveniencing users in consideration of various situations and service characteristics based on the ubiquitous environment.

Subsequently, the methods according to the related art simply interwork services in a single domain, however, users with experience and ability can use the mobility of services having multiple domains. In other words, the method according to the related art cannot flexibly provide the existing services without stopping while receiving heterogeneous service domains and moving various terminals.

Therefore, a need exists for a method capable of flexibly receiving the existing services without needing to stop while users move through various terminals in the ubiquitous environment by dynamically configuring a service execution engine suitable for a multiple terminal environment of users in order to execute u-services but without dividing service domains in the ubiquitous environment.

SUMMARY OF THE INVENTION

The present invention proposes to solve the above problems. It is an object of the present invention to provide a system capable of flexibly receiving services without needing to stop while users move through various terminals in the ubiquitous environment by dynamically configuring a service execution engine suitable for a multiple terminal environment of the users in order to support service mobility between heterogeneous service domains in the ubiquitous environment.

There is provided a server for supporting service in multiple domains, including: a service management unit that receives service and a service execution engine from a service providing server and registers them in a service DB; a profiling server unit that requests device profile to user terminal according to a request from the service management unit and parses device profile received from the user terminal and stores it in a device DB; and a service ensembler that generates a list of services usable in the user terminal based on the device profile stored in the device DB and provides the list of services to the user terminal and extracts a service execution engine suitable for the user terminal from the service DB according to user selection transmits them to the user terminal.

The service management unit registers service profile and service rule on the registered services in the service DB, and registers service execution engine profile and service execution engine rule on the registered service execution engine in the service DB.

The service ensembler compares the device profile with the service execution engine profile registered in the service DB according to the corresponding service execution engine rule and extracts the service execution engine suitable for the user terminal from the service DB.

The server for supporting service in multiple domains further includes: a service demon unit that compares the service profile on the selected service with a service execution engine profile on the extracted service execution engine according to the corresponding service rule in order to investigate whether the extracted service execution engine supports the service selected by the user.

The service demon unit supports at least one of semantic conversion, contents conversion, and protocol conversion of the extracted service execution engine according to the comparison results.

The server for supporting service in multiple domains further includes: a user DB that stores a service use record of the user terminal, wherein the service ensembler extracts most recently used service lists and recommendation service lists suitable for the user from the service DB based on the service use record of the user terminal stored in the user DB and transmits them to the user terminal.

The service use record includes at least one of service use pattern information of the user, service use frequency information of the user, and interesting service field information of the user.

The service management unit transmits device profile requesting messages to the profiling server unit using log-in information of the user while transmitting the recently used service lists and the recommendation service list requesting messages to the service ensembler.

The server for supporting service in multiple domains further includes: an execution engine management unit that transmits the corresponding service execution engine to the user terminals according to the execution engine download request from the service ensembler, wherein the execution engine management unit queries whether the user terminals hold the corresponding service execution engine to the user terminals and transmits the corresponding service execution engine to the user terminals according to the query results.

If the service ensembler is informed that the service execution engine of the selected service is executed, it generates a service execution engine session table to allow the service management unit to manage the session of the corresponding service execution engine and stores it in the session DB.

Further, there is provided a method for supporting service in multiple domains according to another embodiment, including: receiving service and service execution engine from a service providing server to register them in a service DB; requesting device profile from a user terminal; parsing the device profile received from the user terminal to store it in the device DB; generating a list of services usable in the user terminals based on the device profile stored in the device DB to provide the list of services to the user terminals; and extracting a service execution engines suitable for the user terminals from the service DB according to userselection of the user to transmit them to the user terminals.

The receiving the service and the service execution engine from the service providing server to register them in the service DB registers one or more service execution engine for the received service.

The receiving the service and the service execution engine from the service providing server includes: registering service profile and service rule on the registered services in the service DB; and registering service execution engine profile and service execution engine rule on the registered service execution engine in the service DB.

The extracting a service execution engines suitable for the user terminals for the service DB according to user selection to transmit the extracted service execution engine to the user terminal includes comparing the device profile with the service execution engine profile registered in the service DB according to the service execution engine rule.

The extracting the service execution engines suitable for the user terminals from the service DB according to user selection to transmit them to the user terminals includes comparing the service profile on the selected service with a service execution engine profile on the extracted service execution engine according to the corresponding service rule in order to investigate whether the extracted service execution engine supports the service selected by the user.

The method for supporting service in multiple domains further includes performing at least one of semantic conversion, contents conversion, and protocol conversion of the extracted service execution engine when the conversion of the extracted service execution engine is needed according to the comparison results.

The method for supporting service in multiple domains further includes extracting service lists most recently used by the user terminal and recommendation service lists suitable for the user from the service DB based on the service use record of the user terminal stored in the user DB; and transmitting the extracted service lists to the user terminals.

The service use record includes at least one of service use pattern information of the user, service use frequency information of the user, and interesting service field information of the user.

The parsing the device profile received from the user terminal stored in the device DB parses the received device profile and stores it together with identification information on the user and identification information on the user terminal.

The extracting a service execution engine suitable for the user terminal from the service DB according to user selection to transmit the extracted service execution engine to the user terminal queries whether the user terminals hold the corresponding service execution engine to the user terminals and transmits the corresponding service execution engine to the user terminals according to the query results.

The following effects can be achieved by the present invention.

The present invention receives various terminals and various service domains in a u-service framework to flexibly receive the existing services without needing to stop while the users move through various terminals and promotes service interworking between the heterogeneous service domains to enable the service providers to provide a single service to the users without stopping in the ubiquitous computing environment.

DETAILED DESCRIPTION OF THE PREFERRED EMBODIMENTS

The present invention will be described in detail below with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the drawings may be exaggerated for explicit comprehension.

Figure 1:
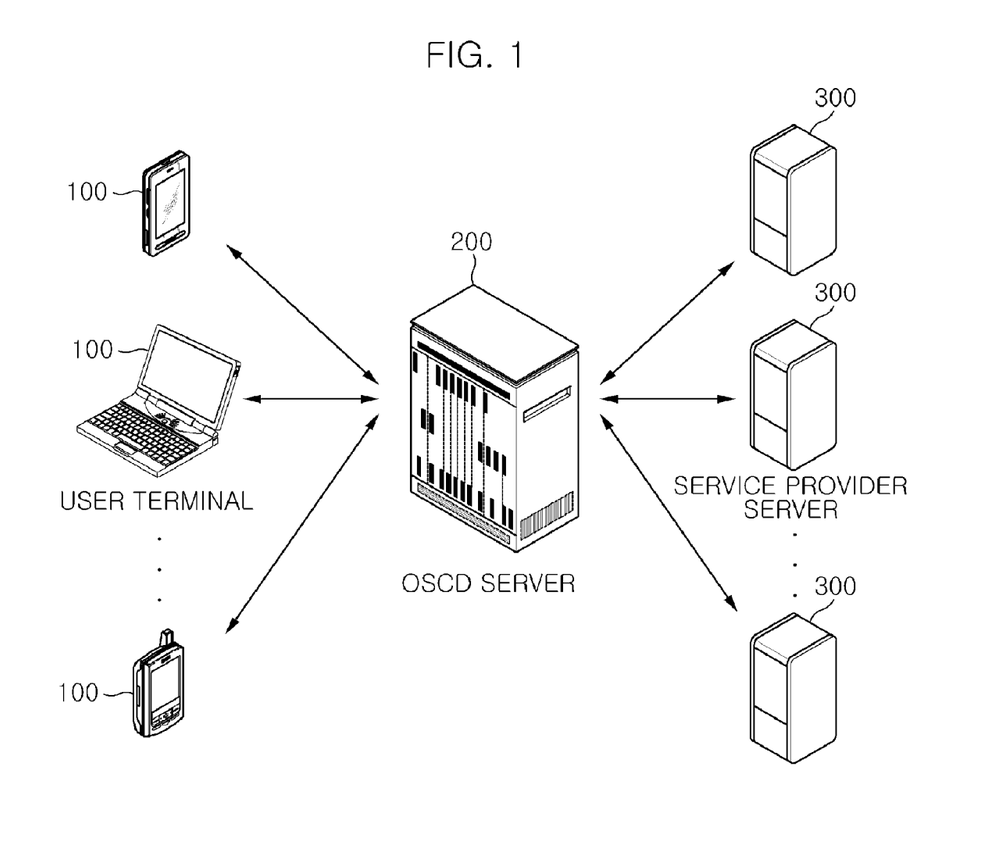
FIG. 1 is an exemplified diagram for explaining a u-service framework system for supporting service in multiple domains according to an exemplary embodiment of the present invention.

FIG. 1 is an exemplified diagram for explaining a u-service framework system for supporting service in multiple domains according to an exemplary embodiment of the present invention.

Referring to FIG. 1, a u-service framework system according to the present invention includes a user terminal 100, an OSCD server 200, and a service providing server 300.

Various user terminals 100 may be exemplified, such as window PC, Linux PC, PMP, PDA, mobile phone, smart phone, notebook, etc. The user terminal 100 provides a GUI interface that can access the OSCD server 200 and search services registered in the OSCD server 200. Thereby, the user uses the user terminals 100 to search the services registered in the OSCD server 200.

The user terminal 100 provides its own device profile to the OSCD server 200 according to a request from the OSCD server 200 and receives recently used service lists, recommended service lists, and usable serviced lists that are provided from the OSCD server 200 and displays them to the user. Therefore, the user can select the desired services in the service lists that are displayed through the user terminal 100.

The user terminal 100 can call the corresponding services through a service execution engine downloaded from the OSCD server 200 and receive the services and the user terminal 100 downloads the service execution engine suitable for the services selected by the user from the OSCD server to automatically execute the corresponding service execution engine and report the execution results to the OSCD server 200.

The OSCD server 200 receives and registers the services and the service execution engines from the service providing server 300.

The OSCD server 200 request the device profile to the user terminal 100 and parses the device profile received from the user terminals 100 and stores it in the DB.

Further, the OSCD server 200 generates the usable service lists in the user terminal 100 based on the device profile stored in the DB and provides them to the user terminal 100 and extracts the service execution engine suitable for the user terminal 100 according to the user service selection and transmits it to the user terminal 100.

In addition, the OSCD server 200 extracts the service lists recently used by the user terminal 100 and the recommended service lists suitable for the user from the DB based on the service use record of the user terminal 100 stored in the DB and transmits them to the user terminal 100.

The service providing server 300, which is a server that provides specific services to the user terminal 100, uses the service registration screen provided by the OSCD server 200 to register the service and the service execution engine provided by the service providing server 300 in the OSCD server 200. In this case, the service providing server 300 registers service profile and service rule on the registered services and service execution engine profile and service execution engine rule on the registered execution engine in the OSCD server 200.

The detailed configurations and functions of each of the user terminal 100, the OSCD server 200, and the service providing server 300 will be described in detail with reference to FIGS. 2 to 5.

Figure 2:
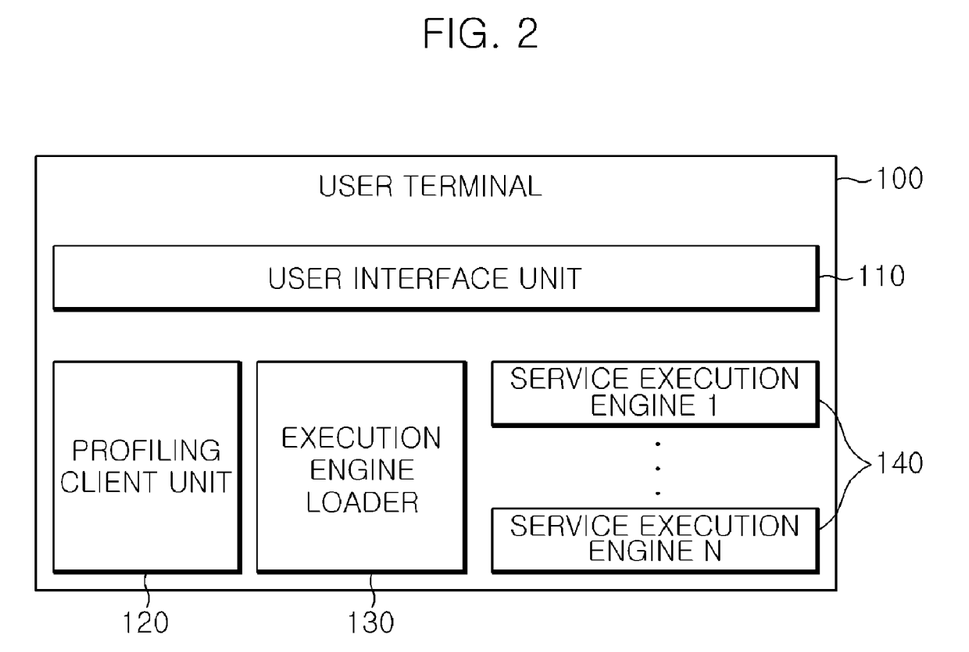
FIG. 2 is a diagram for explaining a user terminal according to an exemplary embodiment of the present invention.

FIG. 2 is a diagram for explaining the user terminal according to an exemplary embodiment of the present invention.

Referring to FIG. 2, the user terminal 100 according to the present invention includes a user interface unit 110, a profiling client unit 120, an execution engine loader 130, and an execution engine 140.

The user interface unit 110 provides the GUI interface that can access the user terminal 100 through the OSCD server 200 and search services registered in the OSCD server 200.

The profiling client unit 120 serves to obtain the device profile of the user terminal 100 and transmit it to the OSCD server 200 when receiving the device profile request message from the OSCD server 200.

The execution engine loader 130 serves to download the service execution engine 140 from the OSCD server 200.

Each of the user interface unit 110, the profiling client unit 120, and the execution engine loader 130 are ported to each user terminal 100 and processes the service execution engine of the corresponding services to transmit the corresponding services to the user terminal 100 when the user accesses the OSCD server 200 using the user terminal 100 to select the desired services.

Figure 3:
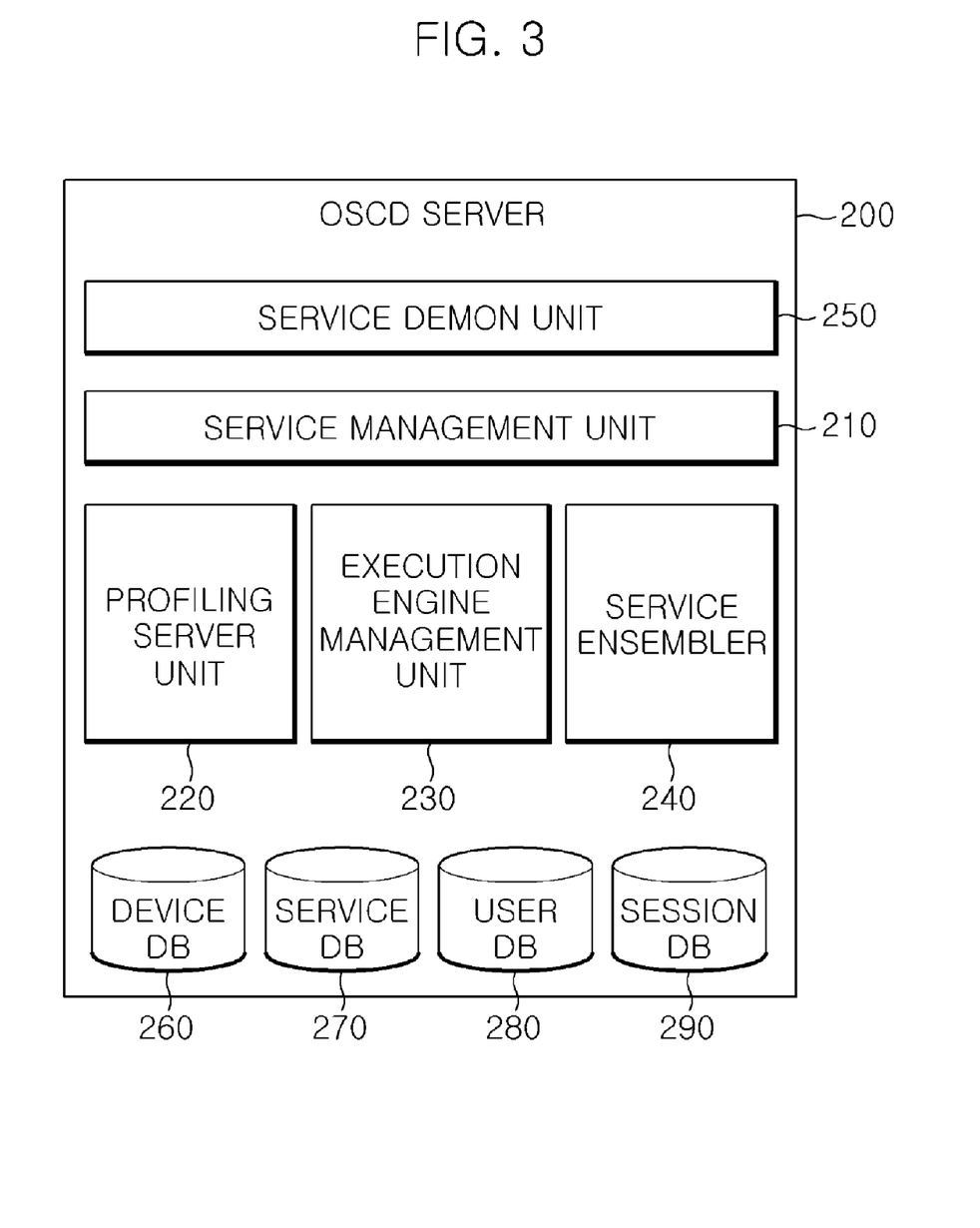
FIG. 3 is a diagram for explaining an OSCD server according to an exemplary embodiment of the present invention.

FIG. 3 is a diagram for explaining the OSCD server according to an exemplary embodiment of the present invention.

Referring to FIG. 3, the OSCD server 200 according to the present invention includes a service management unit 210, a profiling server unit 220, an execution engine management unit 230, a service ensembler 240, a service demon unit 250, a device DB 260, a service DB 270, a user DB 280, and a session DB 290.

The service management unit 210 provides the GUI environment of the OSCD server 200 and the service providing server 300 can register the provided services in the OSCD server 200. In this case, the service management unit 210 registers the service profile and the service rule on the registration services in the service DB 270 and the service execution engine profile and the service execution engine rule on the registered service execution engine in the service DB 270.

Further, the service management unit 210 supports the registration and user authentication of the user terminal 100 and enables the user to search the services registered in the OSCD server 200 through the user terminal 100.

In addition, the service management unit 210 manages the service demon unit 250, the device DB 260, the service DB 270, and the user DB 280 and interworks with the profiling server unit 220, the execution engine management unit 230, the service ensembler 240, while the service demon unit 250 to process the execution engine for the services selected by the user to be transmitted to the user terminal 100.

The profiling server unit 220 asks the profiling client unit 120 of the user terminal 100 to transmit the device profile on the user terminal 100 according to the request from the service management unit 210. The profiling server unit 220 receives the corresponding device profile from the profiling client unit 120 and stores it in the device DB 290. In this case, the profiling client unit 120 parses the received device profile to match it with the user ID and the user terminal ID together and store it.

The execution engine management unit 230 serves to transmit the corresponding service execution engine to the user terminal 100 according to the execution engine download request from the service ensembler 240.

The service ensembler 240 performs the service recommendation function and the service execution engine extracting function suitable for the user and the user terminal 100.

In more detail, the service ensembler 240 generates the usable service lists in the user terminal 100 based on the device profile and the service information stored in the device DB 260 and the service DB 270 and provides them to the user terminal 100. In addition, the service ensembler 240 extracts the service lists recently used by the user terminal 100 and the recommended service lists suitable for the user from the service DB 270 based on the service use record of the user terminal 100 stored in the user DB 280 and transmits them to the user terminal 100. The service use record stored in the user DB 280 may include the service use pattern of the user, the service use frequency of the user, and the interesting service field of the user, etc.

The service ensembler 240 extracts the service execution engine suitable for the user terminal 100 according to the user service selection and processes the extracted service execution engine to be transmitted to the user terminal 100.

The service ensembler 240 generates the service execution engine session table and stores it in the session DB 290 to manage the session of the corresponding service execution engine in the service management unit 210 when it is informed that the service execution engine of the service selected from the user terminal 100 is performed.

The service demon unit 250 supports semantic which provides the execution engine conversion functions such as semantic conversion, contents conversion, and protocol conversion, etc., to access the service providing server 300 when it cannot directly support the services selected by the user due to the transmission of the service execution engine extracted by the service ensembler 240 to the user terminal (i.e., when requiring additional conversion to access the service providing server). In this case, the service demon unit 250 compares the service profile on the selected service with the service execution engine profile according to the corresponding service rule to determine whether the service execution engine is converted.

Figure 4:
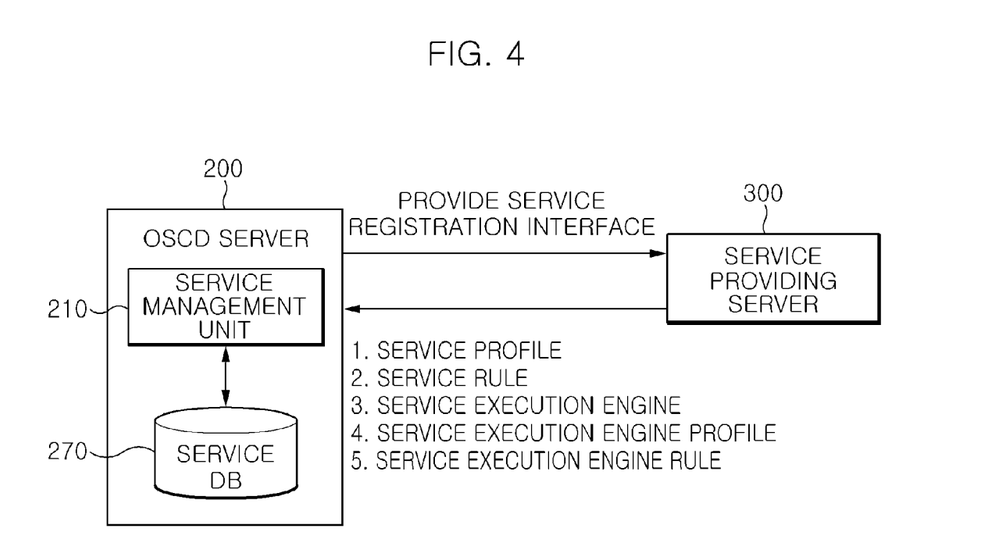
FIG. 4 is a diagram for explaining a service registering method according to an exemplary embodiment of the present invention.

FIG. 4 is a diagram for explaining the service registering method according to an exemplary embodiment of the present invention.

Referring to FIG. 4, the service providing server 300 registers the services provided by the service providing server 300 in the OSCD server 200 by using a service registration interface screen provided by the service management unit 210 of the OSCD server 200. In this case, the service providing server 300 registers the service profile, the service rule, the service execution engine, the profile for each service execution engine, and the service execution engine rule together.

When the service providing server 300 registers the service and the service execution engine in the OSCD server 200, the service management unit 210 stores them in the service DB 270 or updates them.

In other words, the service provider prepares necessary portions on a service (and service execution engine) registration interface screen provided by the service management unit 210 and uploads the service profile, the service rule, the service execution engine, the profile for each service execution engine, and the service execution engine rule in the service DB 270. The category of the registered services includes a large categorization and a small categorization and the service provider can input a search tag through the service registration interface screen.

The service management unit 210 receiving a request for the registration of the services and the service execution engine from the service providing server 300 builds the service DB 270 by using the information obtained through the service registration interface screen. In this case, the service management unit 210 allocates only the service generation key to each of the registration services in order to differentiate the registration services.

The service management unit 210 generates the execution engine table in the service DB 270 by using the information input through the service registration interface screen by the service providing server 300 and links where the uploaded service execution engine, the service execution engine profile, and the service execution engine rule are stored. The service providing server 300 can register a plurality of service execution engines for one service in the OSCD server 200.

Figure 5:
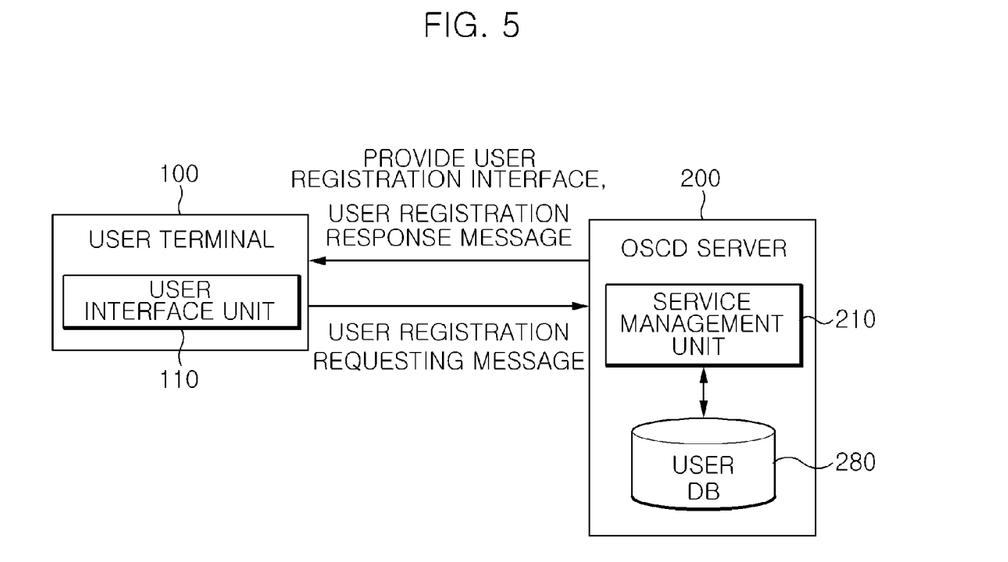
FIG. 5 is a diagram for explaining a user registering method according to an exemplary embodiment of the present invention.

FIG. 5 is a diagram for explaining the service registering method according to an exemplary embodiment of the present invention.

Referring to FIG. 5, the user terminal 100 registers the user in the OSCD server 200 by using the service registration interface screen provided by the service management unit 210 of the OSCD server 200.

When the user registration button provided in the user interface unit 110 of the user terminal 100 is clicked, the user interface unit 110 generates the user registration requesting message and transmits it to the service management unit 210.

The service management unit 210 extracts the user information from the corresponding message to add the user information to the user DB 280 and generates the user registration response message to inform the user that the user is registered.

The service management unit 210 provides the user management function that can manage the user. The service management unit 210 provides the user management screen to view the registered user, which can view the user information when the user ID is clicked and can modify or delete the user information.

Figure 6:
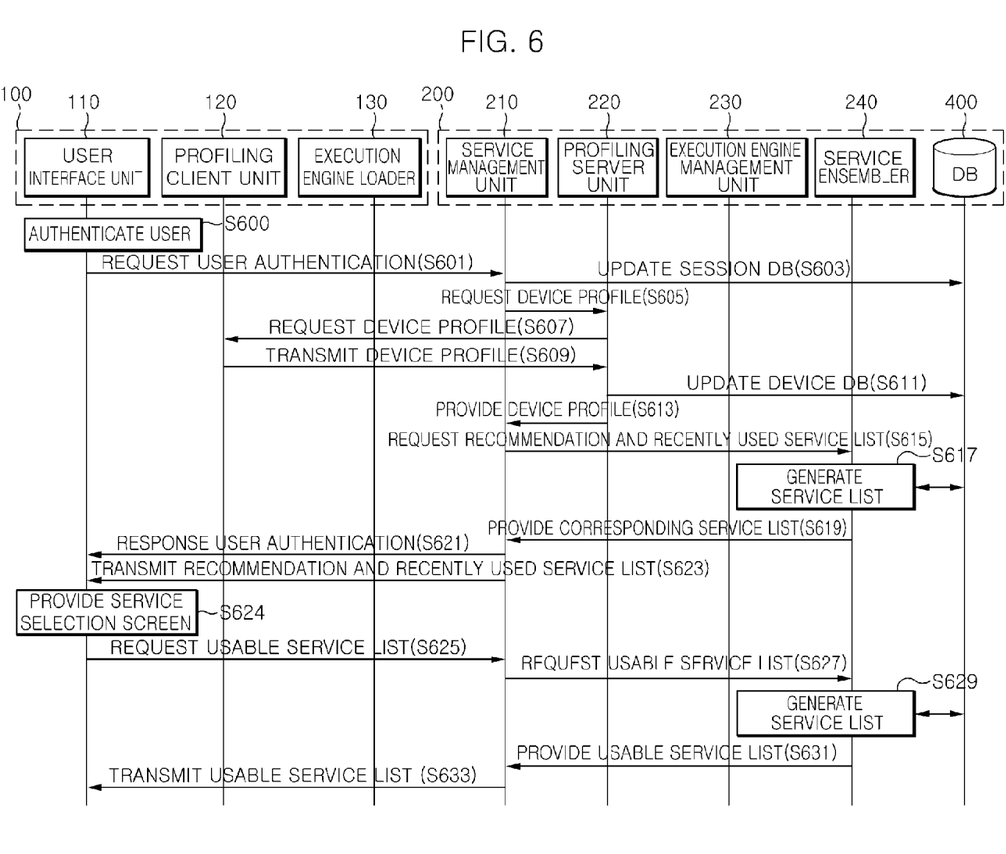
FIG. 6 is a diagram for explaining a user authenticating method, a user, and a user terminal-fitting service providing method according to an exemplary embodiment of the present invention.

FIG. 6 is a diagram for explaining a user authenticating method, a user, and a user terminal-fitting service providing method according to an exemplary embodiment of the present invention. The DB 400 shown in FIG. 6 is commonly referred to as the device DB 260, the service DB 270, the user DB 280, and the session DB 290 that are shown in FIG. 3, which is similarly applied to the description of FIG. 7.

Referring first to FIG. 6, when the user performs an authentication process (log-in process) by using the user interface unit 110 of the user terminal 100 (S600), the user interface unit 110 transmits the user authentication requesting message to the service management unit 210 of the OSCD server 200 based on the information input from the user (S601).

Next, the service management unit 210 processes the user authentication and then, adds the authentication information (log-in information) of the corresponding user to the session DB 400 or updates it (S603).

The service management unit 210 transmits the device profiling request message to the profiling server unit 220 based on the user ID and IP address of the logged in user (S605). In addition, the service management unit 210 transmits the service lists recently used by the user and the user-fitting recommendation service list requesting messages to the service ensembler 240 based on the user ID and IP address (S615), simultaneously with step S605. Since this requires time to process device profiling (S607 to S613), it processes the services most recently used by the user and the user-fitting recommendation services which have nothing to do with the user terminal 100 and first inform the user of it, thereby increasing the performance of the OSCD server 200.

The profiling server unit 220 uses the IP address of the user terminal 100 to transmit the messages requesting the device profile to the profiling client unit 120 of the corresponding user terminal 100 (S607).

The profiling client unit 120 reads the device profile and transmits it to the profiling server unit 220 (S609), according to the request at step S607.

The profiling server unit 220 receives all the device profile from the profiling client unit 120 and then, parses the device profile to update the device DB 400 (S611). The profiling server unit 220 stores the device profile in the device DB 400 and then, links the corresponding position.

Next, the profiling server unit 220 transmits the response message for the device profiling request to the service management unit 210 based on the user ID and the device ID generated by the device DB 400 (S613).

In order to provide the recently used service lists and the recommendation service lists to the user terminal 100, the service ensembler 240 uses the recently used service history, the use pattern of the user, the service use frequency, and the interesting field of the user, etc., which are stored in the use recording table of the user of the user DB 400 to choose the most recently used service lists and the recommendation service lists for each user from the service DB 400 and to be periodically generated in the corresponding table (S617).

If the service ensembler 240 gets a request for the recommendation and recently used service lists from the service management unit 210 (S615), it brings the recently used service lists and the recommendation service lists for each user from the corresponding table and transmits them to the service management unit (S619).

The service management unit 210 receives the recently used service lists and the recommendation service lists from the service ensembler 240 and then transmits the response message for user authentication request to the user interface unit 110 of the user terminal 100 (S621) and transmits the service lists received from the service ensembler 240 to the user interface unit 110 (S623).

The user interface unit 110 divides the service lists from the service management unit 210 of the OSCD server 220 into the recently used services and the recommendation service lists and displays them that can be viewed by the user (S624).

The user interface unit 110 provides the interface screen by which the user can view the recently used service lists, the user-fitting recommendation service lists, the user terminal-fitting recommendation service lists (usable service lists) for each sheet, and so on.

As described above, the recently used service lists and the user-fitting recommendation service lists are transmitted from the OSCD server 220 when the user is logged in, which can be in turn viewed. In the case of the usable service lists, since the device profiling process is required, when the user selects the corresponding sheet on the interface screen after he/she is logged in, the user interface unit 110 transmits the message requesting the usable service lists to the service management unit 210 of the OSCD server 200 (S625).

The service management unit 210 transmits the message requesting the usable service lists to the service ensembler 240 based on the user ID and IP address and the service ensembler 240 extracted and generates the service lists suitable for the user terminal 100 based on the information stored in the user DB, the device DB, and the service DB (S629) and transmits them to the service management unit 210 (S631). Therefore, the service management unit 210 transmits the message to the user interface unit 110 (S633).

Figure 7:
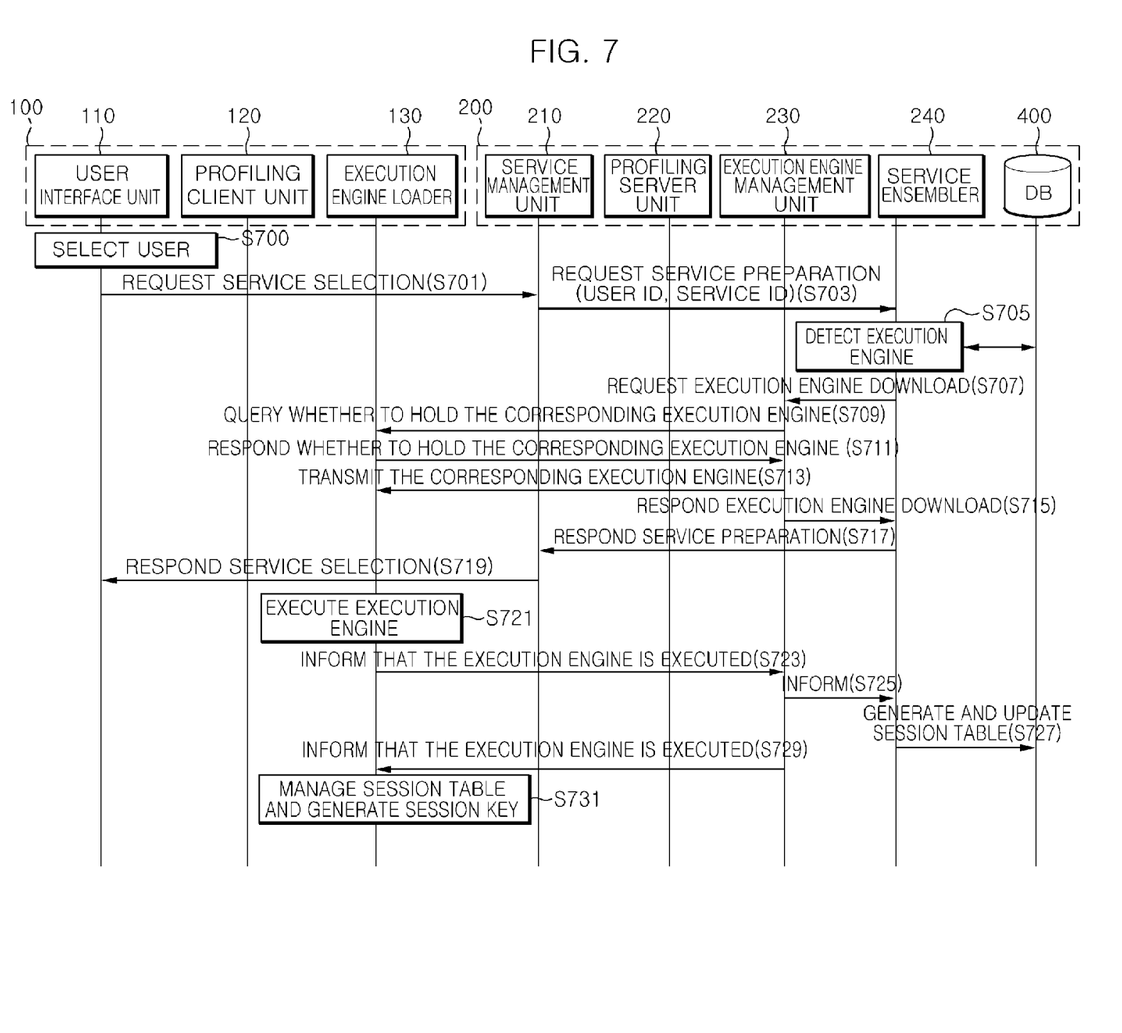
FIG. 7 is a diagram for explaining an execution engine extracting method and an execution engine download providing method based on user service selection according to an exemplary embodiment of the present invention.

FIG. 7 is a diagram for explaining the execution engine extracting method and the execution engine download providing method based on the user service selection according to an exemplary embodiment of the present invention.

Referring to FIG. 7, when the user uses the user interface unit 110 of the user terminal 100 to select the desired services among the service lists provided from the OSCD server 200 (S700), the user interface unit 110 transmits the service selection requesting message to the service management unit 210 of the OSCD server 200 (S701).

Next, the service management unit 210 transmits the message to the service ensembler 240 based on the user ID and the service ID (S703).

The service ensembler 240 extracts the service execution engine suitable for the device from the service DB and the device DB (S705) and transmits it to the execution engine management unit 230 (S707). The method to allow the service ensembler 240 to extract the service execution engine suitable for the device from the service DB and the device DB at step S705 will be described with reference to FIG. 6.

The execution engine management unit 230 queries whether the execution engine loader 130 of the user terminal 100 holds the execution engine to the execution engine loader 130 of the user terminal 100 (S709) and transmits the service execution engine to the execution engine loader 130 of the user terminal 100 according to the queried results.

In more detail, according to the query result, when the execution engine loader 130 holds the corresponding service execution engine, it investigates the version of the execution engine and as a result, if it is determined that the service execution engine is not the latest version, transmits the service execution engine of the latest version to the execution engine loader 130 (S711, S713).

In addition, even when the user terminal 100 does not hold the corresponding service execution engine, it transmits the service execution engine of the latest-version to the execution engine loader 130 (S711, S713). Of course, when the user terminal 100 holds the corresponding service execution engine of the latest version, the service execution engine is not transmitted.

When the execution engine management unit 230 completes the service execution engine transmission to the execution engine loader 130, it reports the service ensembler 240 that the downloading of the service execution engine to the user terminal 100 is completed (S715). The service ensembler 240 reports the service management unit 210 that the service execution engine is downloaded to the user terminal 100 (S717).

Next, the service management unit 210 transmits the response message that the service selection is completed to the user interface unit 110 (S719).

The execution engine loader 130 executes the downloaded or existing execution engine (S721) and informs the execution engine management unit 230 of it (S723).

The execution engine management unit 230 informs the service ensembler 240 that the service execution engine is executed in the user terminal 100 (S725) and the service ensembler 240 generates the service execution engine session table in the session DB 400 (S727) to allow the service management unit 210 to manage the service execution engine session as to whether any user terminal uses any service execution engine.

In addition, the service ensembler 240 informs the service management unit 210 that the service execution engine is executed (S729) such that the service management unit 210 can generate the session key capable of managing the service execution engine session table (S731).

Figure 8:
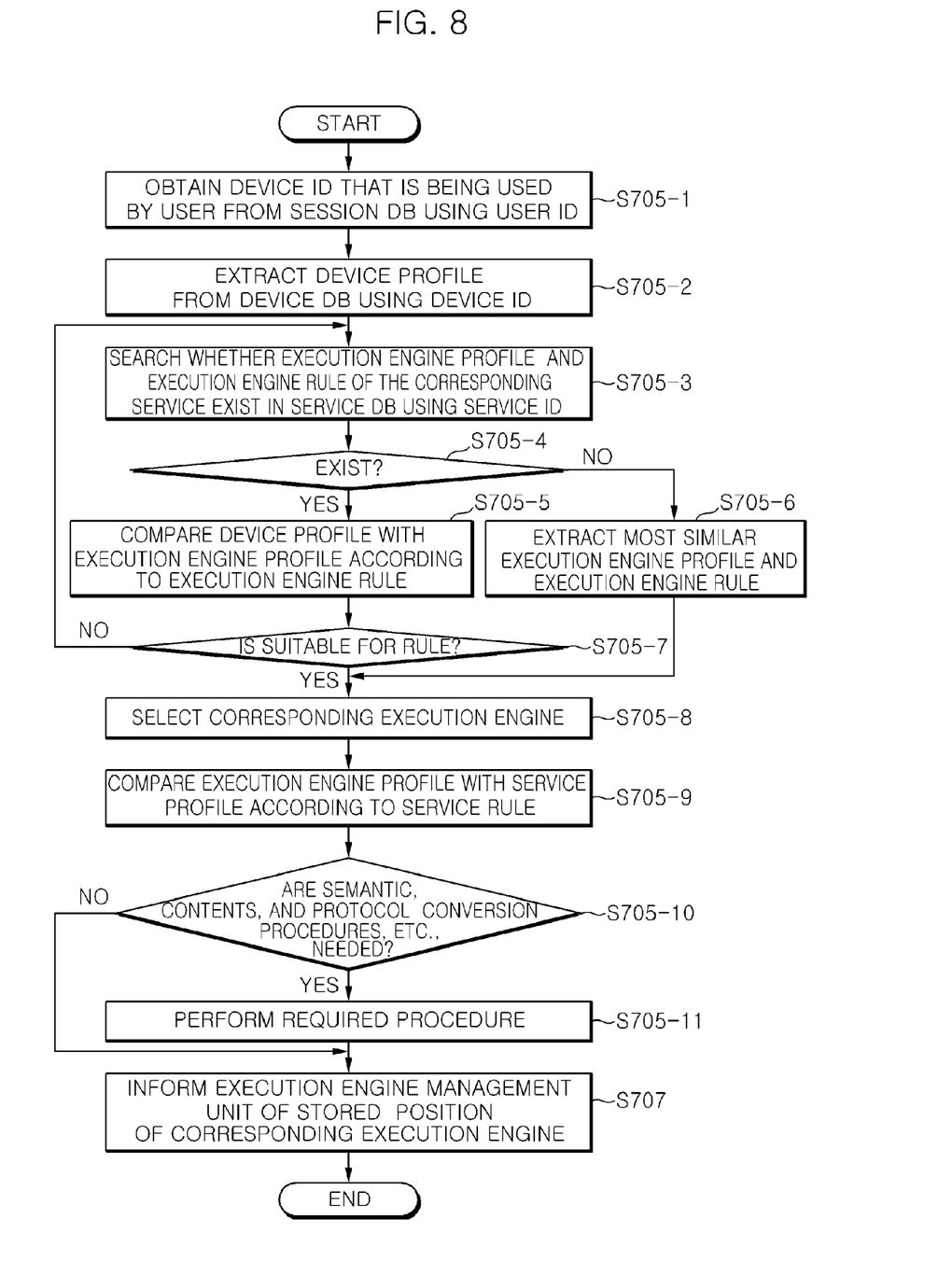
FIG. 8 is a diagram for explaining a service execution engine extracting method suitable for a user terminal in selecting the user services according to an exemplary embodiment of the present invention.

FIG. 8 is a diagram for explaining the service execution engine extracting method suitable for the user terminal in selecting the user services according to an exemplary embodiment of the present invention Referring to FIG. 8, when the user selects the desired services among the service lists provided from the OSCD server by using the user interface unit of the user terminal, the service ensembler gets a request for the extraction of the service execution engine while receiving the user ID and the service ID from the service management unit, as described above with reference to FIG. 7.

The service ensembler obtains the device ID of the user terminal, which is being used by the user, from the session DB by using the user ID (S705-1).

The service ensembler uses the device ID obtained at step S705-1 to extract the device profile of the user terminal from the device DB (S705-2).

Further, the service ensembler searches whether the service execution engine profile and the service execution engine rule on the corresponding service exist in the service DB by using the service ID (S705-3).

When the service providing server registers the services in the OSCD server, it should register one or more service execution engine, such that the service ensembler compares the device profile with the service execution engine profile according to the service execution engine rule (S705-5).

If the corresponding execution engine profile is suitable for the device profile, it can extract the service execution engine that is stored together with the execution engine profile (S705-7, S705-8).

However, if not, the service ensembler finds other service execution engines registered in the services and continuously compares them. According to the comparison results, when there is no proper execution engine profile, the execution engine profile having the highest similarity is extracted (S705-6).

If the execution engine profile suitable for the user terminal is selected, the service demon unit compares the execution engine profile with the service profile according to the service rule to determine whether it can directly support the services selected by the user when the extracted service execution engine is transmitted to the user terminal (S705-9).

According to the determination results at step S705-9, when the conversion of the extracted service execution engine is needed (S705-10), the necessary conversion process is performed (S705-11). In this case, the conversion may be semantic, contents, protocol conversions, etc.

Next, the service ensembler informs the execution engine management unit of the position where the extracted service execution engine is stored to download the corresponding service execution engine to the user terminal (S707).

According to the present invention, it receives various terminals and various service domains in a u-service framework to flexibly receive the existing services without needing to stop while the users move through various terminals, thus promotes the service interworking between the heterogeneous service domains to enable the service providers providing the single service to the users without stopping in the ubiquitous computing environment.

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A server for supporting service in multiple domains, comprising:
    a service management unit that receives service and service execution engine from a service providing server and registers the received service and service execution engine in a service DB;
    a profiling server unit that requests device profile to a user terminal according to a request from the service management unit and parses device profile received from the user terminal and stores the parsed device profile in a device DB;
    a service ensembler that generates a list of services usable in the user terminal based on the device profile stored in the device DB and provides the list of services to the user terminal and extracts a service execution engine suitable for the user terminal from the service DB according to user selection and transmits the extracted service execution engine to the user terminal;
    a service demon unit that compares the service profile on the selected service with a service execution engine profile on the extracted service execution engine according to the corresponding service rule in order to investigate whether the extracted service execution engine supports the service selected by the user; and
    a user DB that stores a service use record of the user terminal, wherein the service ensembler extracts most recently used service lists and recommendation service lists suitable for the user from the service DB based on the service use record of the user terminal stored in the user DB and transmits them to the user terminal,
    wherein the service use record includes at least one of service use pattern information of the user, service use frequency information of the user, and interesting service field information of the user.

2. The server for supporting service in multiple domains according to claim 1, wherein the service management unit registers service profile and service rule on the registered service in the service DB, and registers service execution engine profile and service execution engine rule on the registered service execution engine in the service DB.

3. The server for supporting service in multiple domains according to claim 2, wherein the service ensembler compares the device profile with the service execution engine profile registered in the service DB according to the corresponding service execution engine rule and extracts the service execution engine suitable for the user terminal from the service DB.

4. The server for supporting service in multiple domains according to claim 1, wherein the service demon unit supports at least one of semantic conversion, contents conversion, and protocol conversion of the extracted service execution engine according to the comparison results.

5. The server for supporting service in multiple domains according to claim 1, wherein the service management unit transmits device profile requesting messages to the profiling server unit using log-in information of the user while transmitting the recently used service lists and the recommendation service list requesting messages to the service ensembler.

6. The server for supporting service in multiple domains according to claim 1, further comprising an execution engine management unit that transmits the corresponding service execution engine to the user terminals according to the execution engine download request from the service ensembler, wherein the execution engine management unit queries whether the user terminals hold the corresponding service execution engine and transmits the corresponding service execution engine to the user terminals according to the query results.

7. The server for supporting service in multiple domains according to claim 1, wherein if the service ensembler is informed that the service execution engine of the selected service is executed, the service ensembler generates a service execution engine session table to allow the service management unit to manage the session of the corresponding service execution engine and stores it in the session DB.

8. A method for supporting service in multiple domains, comprising:
    receiving service and service execution engine from a service providing server to register them in a service DB;
    requesting device profile to a user terminal;
    parsing the device profile received from the user terminal to store the parsed device profile in the device DB;
    generating a list of services usable in the user terminal based on the device profile stored in the device DB to provide the list of services to the user terminal;

extracting a service execution engine suitable for the user terminal from the service DB according to user selection to transmit the extracted service excution engine to the user terminal, extracting service lists most recently used by the user terminal and recommendation service lists suitable for the user from the service DB based on the service use record of the user terminal stored in the user DB; and transmitting the extracted service lists to the user terminals, wherein the extracting the service execution engines suitable for the user terminals from the service DB according to user selection to transmit the extracted service excution engine to the user terminal includes comparing the service profile on the selected service with a service execution engine profile on the extracted service execution engine according to the corresponding service rule in order to investigate whether the extracted service execution engine supports the service selected by the user, and wherein the service use record includes at least one of service use pattern information of the user, service use frequency information of the user, and interesting service field information of the user.

9. The method for supporting service in multiple domains according to claim 8, wherein the receiving the service and the service execution engine from the service providing server to register them in the service DB registers one or more service execution engine for the received service.

10. The method for supporting service in multiple domains according to claim 8, wherein the receiving the service and the service execution engine from the service providing server to register them in the service DB includes:

registering service profile and service rule on the registered services in the service DB; and registering service execution engine profile and service execution engine rule on the registered service execution engine in the service DB.

11. The method for supporting service in multiple domains according to claim 10, wherein the extracting a service execution engines suitable for the user terminals for the service DB according to user selection to transmit the extracted service excution engine to the user terminal includes comparing the device profile with the service execution engine profile registered in the service DB according to the service execution engine rule.

12. The method for supporting service in multiple domains according to claim 10, further comprising performing at least one of semantic conversion, contents conversion, and protocol conversion of the extracted service execution engine when the conversion of the extracted service execution engine is needed according to the comparison results.

13. The method for supporting service in multiple domains according to claim 8, wherein the parsing of the device profile received from the user terminal to store the parsed device profile in the device DB parses the received device profile and stores it together with identification information on the user and identification information on the user terminal.

14. The method for supporting service in multiple domains according to claim 8, wherein the extracting a service execution engine suitable for the user terminal from the service DB according to user selection to transmit the extracted service excution engine to the user terminal queries whether the user terminals hold the corresponding service execution engine to the user terminals and transmits the corresponding service execution engine to the user terminals according to the queried results.

* * * * *